May 19, 1970 — L. HUGI — 3,512,939
DEVICE FOR USE IN CONJUNCTION WITH TESTING ELECTRICAL
APPARATUS CONTAINING A GASEOUS FILLING
INCLUDING SULFUR HEXAFLUORIDE
Filed Oct. 2, 1967 — 4 Sheets-Sheet 1

INVENTOR.
Litty Hugi
BY
Pierce, Scheffler & Parker
Attorneys

May 19, 1970 L. HUGI 3,512,939
DEVICE FOR USE IN CONJUNCTION WITH TESTING ELECTRICAL
APPARATUS CONTAINING A GASEOUS FILLING
INCLUDING SULFUR HEXAFLUORIDE
Filed Oct. 2, 1967 4 Sheets-Sheet 2
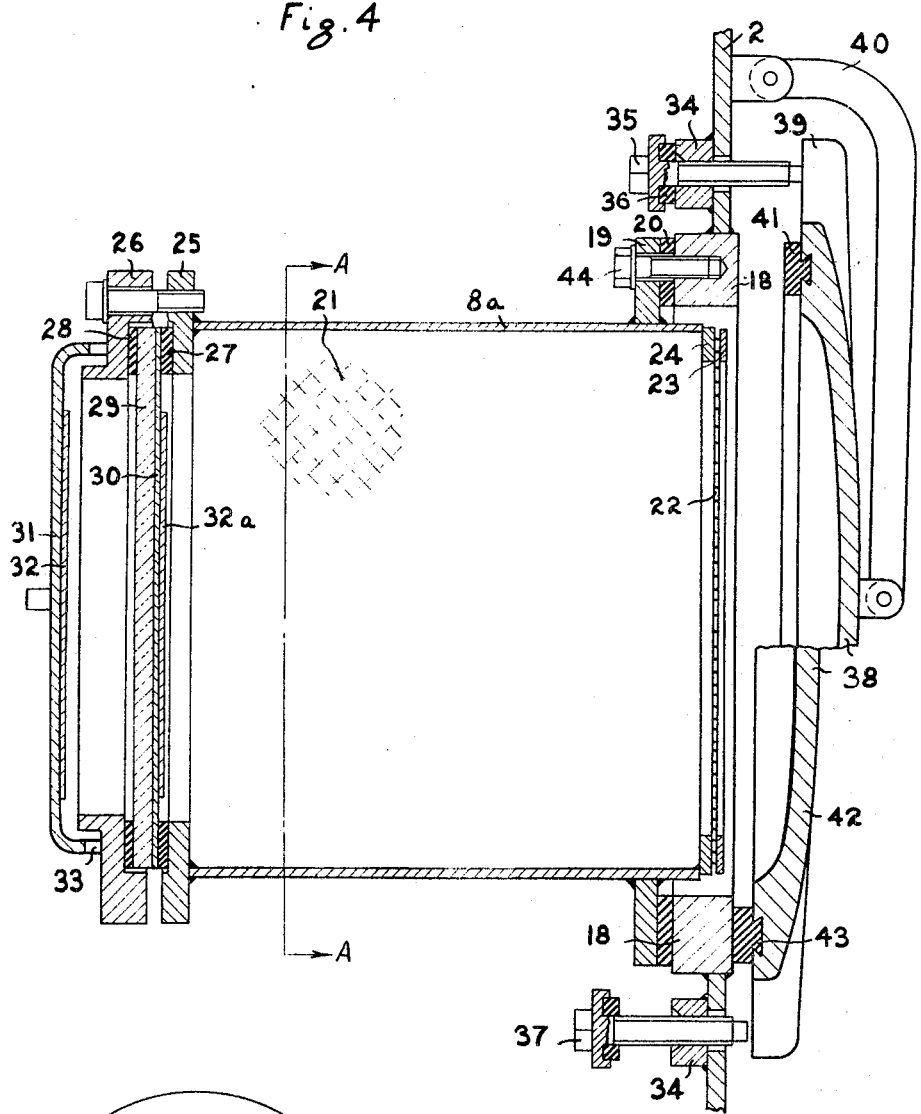
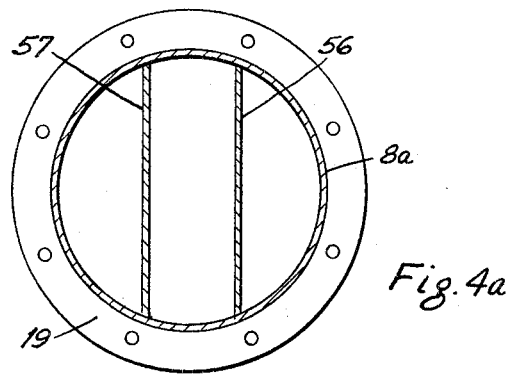
INVENTOR.
Litty Hugi
BY
Pierce, Schiffler & Parker
Attorneys

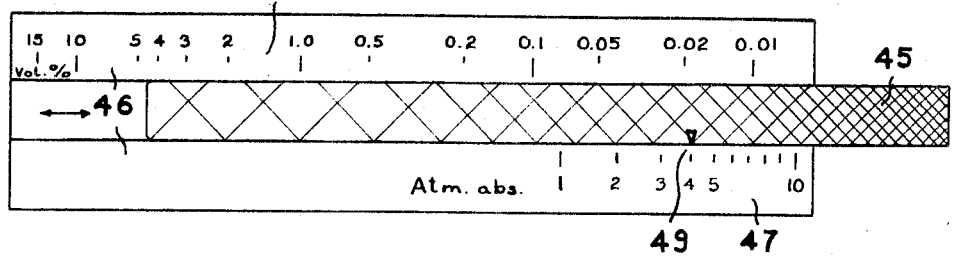
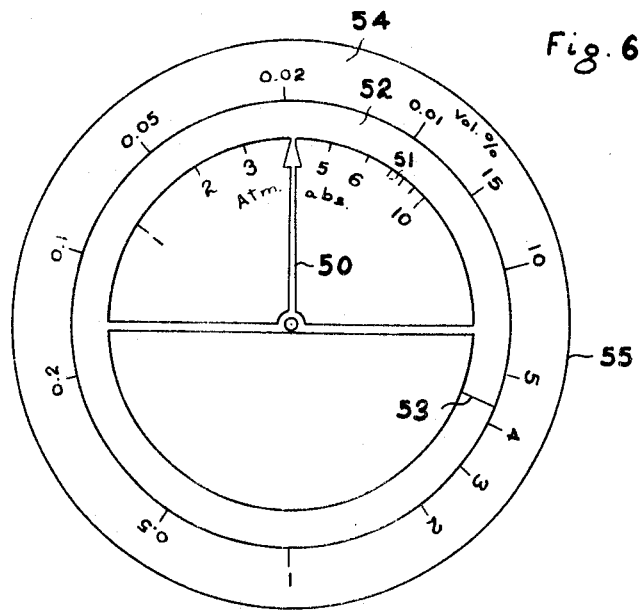

United States Patent Office 3,512,939
Patented May 19, 1970

3,512,939
DEVICE FOR USE IN CONJUNCTION WITH TESTING ELECTRICAL APPARATUS CONTAINING A GASEOUS FILLING INCLUDING SULFUR HEXAFLUORIDE
Litty Hugi, Wettingen, Switzerland, assignor to Aktiengesellschaft Brown Boveri & Cie, Baden, Switzerland, a joint-stock company
Filed Oct. 2, 1967, Ser. No. 672,262
Claims priority, application Switzerland, Oct. 10, 1966, 14,577/66
Int. Cl. G01n 31/32
U.S. Cl. 23—254                    21 Claims

ABSTRACT OF THE DISCLOSURE

A device for determining the presence of harmful gaseous decomposition products of a sulphur hexafluoride ($SF_6$) filling for electrical apparatus such as transformers, encapsulated switchgear and gas-filled cables comprises a receptacle arranged to be placed in communication with the sulphur hexafluoride filling, the receptacle containing a granular material containing OH ions such as activated alumina or magnesia which is dyed with a dyestuff which changes its colour or colour saturation with the pH value. The material exhibits a permanent and irreversible change in colour or colour saturation with the partial pressure of the gaseous contaminants as a result of their initial contact with the material.

---

Figure 1:
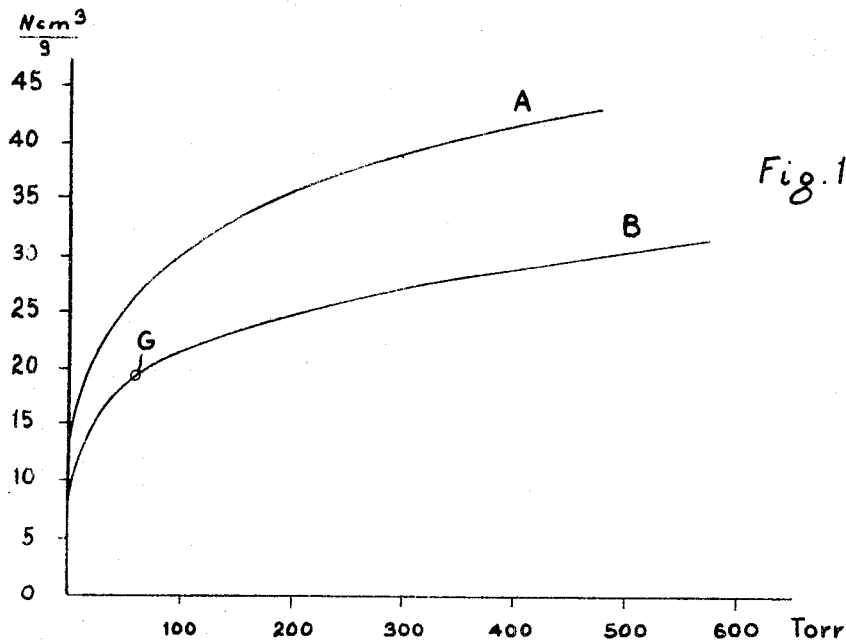

The invention relates to an electrical apparatus with a gaseous filling consisting at least partly of sulphur hexafluoride ($SF_6$), for example a power switch, an encapsulated switching plant, a transformer or a cable.

It is known that gaseous contaminants can occur in the gas filling of such appliances, besides humidity above all but most important decomposition products of the sulphur hexafluoride and secondary reaction products of these decomposition products with the substances present in the electrical appliance. These decomposition processes are caused by elecrical discharges, which in some cases occur in normal operation, as in switches, and in some cases only when faults arise, as in transformers. The gaseous contaminants which occur as a result of decomposition of the $SF_6$, i.e. the decomposition products themselves and their secondary reaction products, are undesirable since they attack the materials used in the appliance, and thus also impair the insulation, consequently endangering the reliability of the appliance, and it is known accordingly to provide the electrical appliance with an adsorbent which takes up the decomposition products before they have led to any appreciable damage.

Such continuous gas-regeneration is attended chiefly by two disadvantages. On the one hand, the adsorbent does not alter in appearance when it takes up more and more decomposition products, so that it is impossible to tell whether and when it is exhausted and must be renewed. On the other hand, the continuous gas-regeneration makes it impossible to tell from the composition of the gas whether there are any dangers or faults.

Switches with $SF_6$ as the extinguishing gas depend in operation and life on the content of decomposition products in the gas remaining as small as possible, or being eliminated again as rapidly as possible after each switching action, but it has become evident that the number of switching actions carried out does not give a usable measure of whether this is being continually fulfilled, and whether the devices and means provided for this purpose are still sufficiently effective.

Gas-filled transformers make it impossible to use the "Buchholz" relay, which is usual with oil transformers, and which has the great advantage of detecting and reporting faults at an early stage. Monitoring the gas composition, for example by taking samples, which has already been proposed as a substitute, is open to objection in that it necessarily precludes the use of an adsorbent for decomposition products, and would only be of similar value to the Buchholz relay if it could always be carried out at the instant when a fault occurred, which is naturally impossible. In addition, the requirement to carry out such continuous inspection of an appliance in operational use would be practically as lacking in feasibility as the need to carry out investigation, for example of a chemical or dielectric kind, involving the use of a laboratory.

It would therefore appear to be appropriate to make use of physical quantities capable of being monitored in known manner by built-in devices, but this has proved to be unsuitable here because of slight or unclear effects (breakdown strength, dielectric angle of loss), excessive expense (mass or infra-red spectrometers), or lack of specificity (density, heat-conductivity). Thus, should this method be used with the addition of an adsorbent, it would merely be possible when the latter began to become ineffective (in the case of switches), or when a fault occurred after the adsorbent had been exhausted (in the case of transformers).

This disadvantage would also arise if an attempt were made to make use of the fluorinating capacity of S—F compounds resulting from the decomposition of sulphur hexafluoride ($S_2F_2$, $SF_2$, $SF_4$) in order to produce colour changes in coloured metallic salts or metallic oxides. It has in addition been discovered that this method also cannot be used because the said S—F compounds proceed unaltered only in exceptional cases from the place at which they are produced to the metallic salt or oxide, but on the contrary change into $SOF_2$ on the way because of their great capacity for reacting with oxygen compounds, and besides in small quantities also into $SO_2F_2$ or sometimes $SOF_4$; as it has been possible to discover, however, S—O—F compounds do not produce any clear and, at the same time, specific changes in metallic salts.

In the light of these circumstances, I have solved the problem of making it possible at least approximately to monitor the quantity of gaseous contaminants produced in the gas filling by decomposition of the $SF_6$, and at the same time if appropriate the degree to which the adsorbent is exhausted; the former even if an adsorbent is present, i.e. in spite of the fact that the contaminants produced are immediately taken up by the adsorbent, and both as regards the small quantities to be expected should there be a transformer fault, and as regards the considerably greater quantities to be expected when a power switch is in operation. According to the invention, the problem is solved by a device which makes it possible to recognise gaseous contaminants produced in the gas fillings by decomposition of the $SF_6$, such recognition remaining substantially independent of the time for which the said contaminants act, the said device comprising a receptacle to the interior of which the gas filling of the electrical apparatus has access, and wherein there is a granular material containing OH ions and having a relatively large internal surface, the said material being at least partly dyed with at least one indicator substance which changes its colour or colour saturation with the pH value. The material undergoes a permanent and irreversible change in colour or colour saturation with the partial pressure of the gaseous contaminants as a result of their initial contact with the material, thus providing an indication that such contaminants have been produced. The indication is permanent and irreversible and remains the same even after the contaminants have disappeared out of the gas filling and hence are no longer present. The invention furthermore makes preferred provision for the material containing OH ions to be coarse-grained activated alumina or magnesia, and for the colour indicator substance to be at least one of the following dyestuffs: metanil yellow, 4-dimethyl amino azobenzene, quinaldine red, or crystal violet.

The invention proceeds from the fact that compounds of both S—F and S—O—F are easily hydrolisable in like manner, and from the fact that it has been observed that substances of a basic character, such for example as the precipitated hydroxides of magnesium, barium or aluminium, gradually lose their basic character and gradually become transformed into fluorides and oxyfluorides as a result of reaction with the decomposition products of $SF_6$ or the secondary reaction products thereof. This change may be made visible by dyeing with a suitable indicator dyestuff, for example a 0.1% alcohol solution of bromocresol purple.

However, precipitated hydroxides have for various reasons proved to be unsuitable for solving the problem. Surprisingly, the colour-change of the indicator proved to be reversible, in that it changed back after the action of the gas-contaminants ceased or became less. This shows that the reaction with the precipitated hydroxide, and thus the colour-change, took place at first only on the surface of the grains, and that compensation subsequently occurred between the surface and the not discoloured interior of the grains. Should it be desired to monitor an electrical apparatus for faults by this means, the colour of the indicator should be checked at the latest shortly after the faults have ceased.

Another effect noticed when using precipitated hydroxides with indicator dyeing was a colour-change zone which processed slowly into the body of the substance, and which did indeed spread in relation to the concentration of gas-contaminants, but there was great dependence on the time for which the action lasted. Thus, should it not be known how long the action lasted, it would be impossible to decide whether a colour-change zone of a definite depth had been produced by brief action of a strong concentration or long action of a weak concentration of gas-contaminants. This disadvantage appeared to an increased extent when an attempt was made, by using very fine-grained material, to reduce the aforesaid disadvantage of colour-change reversal due to compensation with the interior of the grains. Not last, however, must consideration be given to the simultaneous presence of an adsorbent, always desirable and usually indispensable, but, as already shown, making the evidence of such monitoring means questionable. It would thus be impossible to decide with the aid of precipitated hydroxides with indicator dyeing, for example in the case of a slight colour-change, whether there is heavy gas-decomposition with the adsorbent still fully effective and continuously and immediately taking up the gas-contaminants produced by the decomposition, so that they cannot reach any strong concentration in the gas filling, or whether there is only slight gas-decomposition with the adsorbent exhausted; i.e. it would be impossible in this way to monitor either the electrical apparatus for faults and their scope, or the adsorbent for exhaustion. These disadvantages have likewise been observed in the case of basic dyestuffs on an inert carrier substance, no matter whether using dyestuffs which are themselves present in free-base form, or dyestuffs which had been given the colour corresponding to the basic state by impregnation with a base.

The invention is furthermore based on the concept that the two problems of (1) monitoring the electrical apparatus for gas-decomposition and (2) the adsorbent for exhaustion will simultaneously become capable of solution without any mutual interference as a result of using the same means on the same medium, which is of a kind that it both takes up the gas-contaminants as soon as they are produced and is gradually exhausted as a result, i.e. a material which behaves as an adsorbent, and can thus itself expediently act simultaneously as an adsorbent. In practice, it is then naturally often sufficient to provide only some of this material with the indicator dye and use it for monitoring purposes, while the whole quantity serves as an adsorbent.

According to the invention, a granular material containing OH ions with a relatively large internal surface should be chosen for this purpose, preferably coarse-grained activated alumina, or coarse-grained activated magnesia, and as a result the indication given by the indicator which changes its colour with the pH value corresponds, permanently and substantially independently of the time for which the action lasts, to the total quantity of gaseous contaminants produced up to the instant of observation by decomposition of the $SF_6$, the degree of exhaustion of the material used as the indicator-carrier and adsorbent being simultaneously indicated. In this connection, the disadvantages observed in the case of precipitated hydroxides are avoided. The change-over range of the indicator which changes its colour with the pH value must be so disposed that the "basic" colour-tint appears on the "fresh" activated alumina; to what pH value this corresponds depends on the pre-treatment (annealing) of the alumina. In the case of slightly basic commercial qualities, the change-over point of the dyestuff must be disposed at a pH of <9; the sensitivity with which decomposition products are indicated can vary within wide limits according to the change-over range of the indicators, which will be shown hereinafter with the aid of examples. The gas which is in balance with the alumina, an only partly dehydrated aluminium hydroxide, is possibly not $SOF_2$ or any other S—O—F compound, but $SO_2$, at least when the alumina is slightly charged, so that it can be assumed that in this case the following processes take place in purely formal fashion when the $SOF_2$ for example is adsorbed to the alumina:

$AlO(OH) + SOF_2 \rightarrow AlO(OH) \ldots SOF_2$ (adsorbed)
$AlO(OH) \ldots SOF_2 \rightarrow AlF_2(OH) \ldots SO_2$ (adsorbed)
$AlF_2(OH) \ldots SO_2 \rightarrow AlF_2(OH) + SO_2$ i.e. $SO_2$ partly desorbed with the formation of a balance. In this connection, any humidity which may be present plays no part. In the absence of any other acid gases, the colour-change of the indicator which changes its colour with the pH value is specifically for decomposition products of the $SF_6$ and secondary reaction products thereof. It is surprising that the indicator changes its colour without the presence of water. This circumstance is also decisive for the utility of the invention, since assistance could not be derived from water in an electrical appliance.

The activated alumina is naturally dried before being introduced into the electrical apparatus; this can be done with alumina already dyed with the indicator, in which case the permissible temperature for the indicator must not be exceeded, but drying and dyeing may also be carried out in a complex process and a higher drying temperature chosen before dyeing, with the result that the drying time is reduced, a lower drying temperature being used after dyeing, when essentially only the dyestuff-solvent, expediently alcohol, remains to be expelled. The dried alumina must then not be exposed to humid air any more until it is introduced into the electrical apparatus. The treatment may be carried out substantially in accordance with the following example, which however does not exclude other types of treatment:

Example 1

Commercial coarse-grained activated alumina is dried at 250° C., dyed with 0.2% alcohol indicator solution, and then dried at 110° C.

In FIG. 1, curve A represents the adsorption characteristic of the undyed activated alumina with $SOF_2$, showing how the gas splits up between the gas phase and the adsorbent; it will be seen for example that 35 normal cubic centimetres are adsorbed per gram of alumina at a partial pressure of 200 torr.

Curve B shows the adsorption charatcertistic after dyeing the same alumina with crystal violet, but practically the same curve results after dyeing with another dyestuff. It must thus be noted that the adsorption capacity of acivated alumina is somewhat reduced by dyeing. No disadvantage is involved in compensating for this by a somewhat larger quantity in the electrical apparatus, because of the cheapness of the material; but the limitation of dyeing only some of the activated alumina may be accepted, and there is then the attendant advantage of a margin of safety in that the undyed alumina is still not greatly exhausted when the dye is already showing this and giving a warning that replacement is required.

The following examples relate to various ways of dyeing the indicator which have been discovered in numerous experiments with a large number of dyestuffs, and which it is preferred to use according to the invention since they yield readily perceptible colour-changes and good sensitivity of indication for the present purpose, but patent protection is also claimed for the use within the scope of the idea of the invention of other dyestuffs, known or yet to be discovered.

Example 2a

The activated alumina is treated in accordance with Example 1, crystal violet serving as the indicator dyestuff. Under the conditions corresponding to curve B in FIG. 1, the colours grouped in Table 1 appear.

TABLE 1

| $SO_2$ partial pressure torr: | N ml. adsorbed $SOF_2$ per gram act. alumina | Crystal violet, colour |
|---|---|---|
| 0 | 0 | Violet. |
| <1 | 3.0 | Blue. |
| <1 | 8.8 | Greenish blue. |
| 30 | 17.0 | Bluish green. |
| 137 | 23.3 | Green. |
| 345 | 27.8 | Yellowish green. |
| 575 | 31.8 | Greenish yellow. |

It will be seen that this dyestuff begins to respond even at fairly low partial pressures, and exhibits colour-changes over a wide range until the activated alumina is exhausted; it is thus suitable above all for uses in which copious formation of decomposition products must be expected, for example in switches. When a green tint is reached, the indication is that the alumina is practically exhausted, and that the $SO_2$ partial pressure has reached a value of about 100 torr, and will rise rapidly upon further introduction of decomposition products. However, at 100 torr the alumina has already (cf. FIG. 1, curve B) taken up about 20 N ml. of $SOF_2$ per gram of alumina. According to the quantity of adsorbent, large quantities of decomposition products can be formed in a switch before this state is reached.

Example 2b

The activated alumina is treated in accordance with Example 1, 4-dimethyl amino azobenzene serving as the indicator dyestuff. If it is thereupon exposed to gas-contaminants produced by decomposition of the $SF_6$, the colour-changes according to Table 2 are observed.

TABLE 2

| $SO_2$ partial pressure torr | N ml. adsorbed $SOF_2$ per gram act. alumina | 4-dimethyl amino azobenzene colour |
|---|---|---|
| 0 | 0 | Bright yellow. |
| ≪1 | 0.1 | Incipient pink colouring. |
| ≪1 | 0.3 | Pink. |
| ≪1 | 0.5 | Bright red. |
| ≪1 | 0.7 | Red. |
| ≪1 | 1.0 | Dark red; no further darkening of colour with further introduction. |

According to this, a clear colour-change is observed even with extremely small quantities of decomposition products, namely in a range in which the $SO_2$ balancing pressure is still practically zero. Such a colour-indicator is thus to be recommended for uses in which no decomposition of the $SF_6$ should occur, and even the smallest quantities of decomposition products indicate a fault. Transformers are an example of the use.

Example 2c

The activated alumina is treated in accordance with Example 1, metanil yellow serving as the indicator dyestuff. If it is thereupon exposed to gas-contaminants produced by decomposition of the $SF_6$, the colour-changes according to Table 3 are observed.

TABLE 3

| $SO_2$ partial pressure torr: | N ml. adsorbed $SOF_2$ per gram act. alumina | Metanil yellow, colour |
|---|---|---|
| 0 | 0 | Yellow. |
| ≪1 | 0.1 | Do. |
| ≪1 | 0.3 | Reddish yellow. |
| ≪1 | 0.5 | Orange. |
| ≪1 | 0.7 | Colour of red rubber. |
| ≪1 | 1.0 | Wine-red. |

The sensitivity of indication is accordingly almost as high as with 4-dimethyl amino azobenzene, and as regards use, the same applies as was stated with reference to the latter in Example 2b.

Example 2d

The activated alumina is treated in accordance with Example 1, quinaldine red serving as the indicator dyestuff. If it is thereupon exposed to gas-contaminants produced by decomposition of the $SF_6$, the colour-changes according to Table 4 are observed.

TABLE 4

| $SO_2$ partial pressure torr: | N ml. adsorbed $SOF_2$ per gram act. alumina | Quinaldine red, colour |
|---|---|---|
| 0 | 0 | Red. |
| <1 | 8.9 | Bright red. |
| 7 | 13.3 | Pink. |
| 27 | 17.3 | Pale pink. |
| 144 | 23.6 | Do. |

According to this, the quinaldine red indicator, as opposed to the indicators according to the other examples, exhibits no change in tint, but only in colour-saturation. The response limit is still higher than in the case of crystal violet, and not such an extended range is covered as in the case of the latter. Quinaldine red is nevertheless of useful significance, since it is suitable for upwardly continuing the range of indication of 4-dimethyl amino azobenzene or metanil yellow, which is exhausted after the formation of minimal quantities of decomposition products. Any additional activated alumina dyed with quinaldine red which may be present then makes it possible, in the case of a transformer for example, to distinguish between slight faults and catastrophic occurrences, and if required to cause a switch-off in the case of the latter. Furthermore, the range of indication of the quinaldine red indicator, upon fading to pink or pale pink, suffices to give notification that the adsorbent must be renewed, which will be done at a lower state of exhaustion in an electrical apparatus in which discharges are not, in general, normal operational phenomena than in the case of a switch for example. The quinaldine red may however also be replaced by crystal violet for these uses.

In Tables 1 to 4, the adsorbed quantity of gas relates to the $SOF_2$ occurring predominantly upon decomposition of the $SF_6$, since corresponding experiments were carried out with the addition of pure $SOF_2$. It has however transpired there is no essential change in the results if the $SOF_2$ is partly or completely replaced by other decomposition products of the $SF_6$ or secondary reaction products thereof. If a concentration of the indicator solution other than that given in Example 1 is chosen, this does not alter the tints of the indicators, but at all events the saturation of the colours.

As already mentioned, the colour-change of the indicator which changes its colour with the pH value on the material containing OH ions is specifically for gas contaminants produced by decomposition of the $SF_6$; thus, in particular it does not respond to another gas contaminant which can appear in such electrical apparatus, namely humidity, i.e. water-vapour. On the other hand, water-vapour is also adsorbed by the material, for example activated alumina, provided that the latter started in a sufficiently dry state. Certainly, water-vapour ought not normally to appear, since such electrical apparatus are carefully dried before being put in operation, and while in operation are kept at excess pressure with respect to the surrounding atmosphere, among other things in order to prevent the entry of humid air, but experience has shown that humidity cannot be excluded once and for all with complete security. It may therefore be all the more worth while to monitor high-voltage apparatus for humidity as well as for gas-decomposition. The device according to the invention then expediently comprises, additionally and in known manner, material dyed with a humidity-indicator, and it is advantageous if the carrier material for the humidity-indicator is the same granular material containing OH ions with a relatively large internal surface as is otherwise used. In fact, this not only avoids the use of a further carrier material, but it has also been found that known humidity-indicators, for example cobalt salts, react specifically to humidity and not to other gas contaminants produced by decomposition of the $SF_6$ if they are disposed on this carrier material.

According to the above, it may follow that a plurality of indicator dyes are used simultaneously for one electrical apparatus. Mixed dyes on the same grain are expedient only in exceptional cases, and in general different grains will be differently dyed. In order that these may be kept and separately introduced and exchanged, it is expedient for the receptacle to be subdivided into a number of spaces corresponding at least to the number of indicator dyes provided. The gas filling of the electrical apparatus must then naturally have access to each compartment. If some of the carrier material for the indicator dyes is used undyed only as the adsorbent, and if the number of indicators dyes used is $n$, $n+1$ compartments will preferably be arranged in the container, since it is advisable in appropriate cases to accommodate the undyed adsorbent also in the device according to the invention, so that it may be introduced and exchanged by means which must moreover be provided for this purpose.

In general, it is sufficient if the gas filling has access to the receptacle; gas contaminants then generally pass within a short time into the device according to the invention by convection and diffusion. In the case of electrical apparatus in which free convection does not take place or is altogether impossible, and in which considerable quantities of decomposition products are sometimes formed within a short time, it may however be advantageous if the gas filling is continuously or intermittently blown in forced fashion through the receptacle. Suitable devices which can be additionally used for this purpose are often present anyway in gas switches. In any case, it can be arranged that the device according to the invention assumes its monitoring function without any appreciable time-delay, and that the adsorbent, even if the whole quantity thereof is accommodated in the device, comes into action without any appreciable time-delay.

Since some of the indicator dyestuffs which may be used are not particularly colour-fast, it is expedient to protect the contents of the container from continuous incident light by a cover over the inspection glass. It is advisable to design the said cover to close automatically by gravity or spring-loading so that it is impossible to forget to close it after an observation has been made. It may also be advantageous, in addition to the cover or in place thereof, to protect the dystuffs from fading with a light-filter which absorbs short-wave radiation.

According to a further development of the invention, the interior of the device may be temporarily closed in sufficiently gas-tight fashion with respect to the gas filling of the electrical apparatus, and temporarily opened to the exterior without any appreciable loss of the said gas. This makes it possible to exchange the material with the indicator dye, and if required also the undyed adsorbent additionally present, without any serious loss of gas, and even without any break in operation.

Because the human memory is inadequate for colour-tints, it is important for there to be a colour-comparison table accessible to the observer at least for one indicator dye used. It would be less expedient but not impossible, however, for the observer to carry such a table about with him.

As already stated, and as may be seen from FIG. 1, the gas splits itself up between the gas phase and the adsorbent according to the adsorption characteristic, no matter what overall pressure prevails in the electrical apparatus. This means that the tint gives an indication only of the partial pressure of the decomposition gases, and only of their percentage concentration by volume if the overall pressure is known. Thus, the occurrence of a definite colour is an indication of various degrees of decomposition of the $SF_6$ at various overall pressures. In the case of crystal violet for example, if decomposition is allowed to rise as far as a pronounced green tint corresponding to point G on curve B in FIG. 1, i.e. as far as a balancing pressure of about 60 torr, that corresponds to a concentration of about 2% by volume at an overall pressure of 4 ata. Should it be desired likewise to tolerate decomposition of up to 2% by volume at 10 ata., renewal of the adsorbent might be postponed as far as a tint corresponding to a partial pressure of about 150 torr. Corresponding considerations apply to the highly sensitive indicators; for example, 4-dimethyl amino azobenzene shows a clear colour-change at a balancing pressure of about 0.1 torr; in apparatus with an overall pressure of 4 ata., this would correspond to a concentration of about 0.003% by volume or 30 p.p.m. If it is merely a matter indicating that a fault has occurred or that an abnormal condition is on the way, or if the overall pressure in the apparatus is always approximately the same, it may be enough merely to know the tint or the partial pressure of the decomposition gases; however, if it is a matter of determining the gravity and nature of a fault or finding out the degree of danger to the apparatus, it appears to be desirable to learn the concentration in any particular case even at differing overall pressures. It is certainly quite possible to make a corresponding evaluation in the light of a knowledge of the overall pressure, which can be read off on the manometer which is usually present anyway, but on the other hand it is time-wasting and presupposes that trained staff is available.

In a further development of the invention, this disadvantage may be eliminated by the provision of an evaluating device, with a first unit consisting of the colour-comparison table in the form of a colour-scale on which the colours are arranged in the sequence in which the indicator passes through them with increasing partial pressure of the gaseous contaminants which it detects, and with a pointer fast therewith, and with a second unit carrying one scale for the overall pressure of the gas filling in the electrical apparatus and another scale for the content of contaminants in percentage by volume, one of the two units being displaceable with respect to the other, and the scales being so arranged that when the pointer is set to the overall pressure of the gas filling which can be read off on a manometer, the content of contaminants in percentage by volume can be read off beside the colour on the colour-scale corresponding to the indicator colour.

A further improvement is achieved as a result of the fact that the pointer and the overall pressure of the gas filling are automatically brought into agreement by a manometer. There is then no need to fit a further separate manometer to the electrical apparatus.

If the colours on the colour-comparison table or scale cannot be expected with certainty to be fast, it is expedient to protect them likewise from fading with the aforementioned cover or light-filter, or to provide for this purpose a separate cover or light-filter which absorbs short-wave radiation.

As has been found, it is important, if the colour-comparison is to be reliable and accurate, that the indicator colour and comparison colour be capable of being compared under light of the same spectral composition and intensity, and where possible directly side-by-side. In this connection, it must be stated that the same spectral composition is necessary, and the same intensity is in any case desirable, while side-by-side location of the colours to be compared facilitates taking a reading and increases the accuracy thereof; it must be decided in the individual case whether this is necessary. In order that all these requirements may be fulfilled in optimum fashion, it is proposed that the indicator colouring and the colour-comparison table be illuminated by the same source of artificial light, and be made visible side-by-side in an optical device. If such a device is provided, it is in some circumstances quite unnecessary to provide the aforementioned inspection glass for direct observation of the material provided with the indicator dye, so that there is not even any danger of the dyestuffs fading, and devices for avoiding the same become unnecessary.

The means so far stated for monitoring the electrical apparatus for gas-decomposition, and if required also for humidity, are of a purely visual nature, and their value depends on observation being regularly carried out on the spot. Since observation cannot be carried out as frequently as may be desired, it is impossible to guarantee that faults or incipient damage will in all circumstances be discovered in good time in this way. This may in itself be sufficient in the case of such reliable apparatus as transformers for example, but it often happens that they are located at unattended stations, and even more in the case of power switches an occasional observation at the apparatus themselves would appear to be not always satisfactory. Therefore, remotely measuring and transmitting the colour of at least one indicator dyestuff and, optionally, the overall pressure of the gaseous filling, sometimes may be desirable for obtaining a remote transmission of the contamination rate and optionally, of the humidity of the gaseous filling. This installation may be combined with an automatic warning and release system. The means for solving this problem, however, are well known and do not constitute a part of the present invention.

Figure 2:
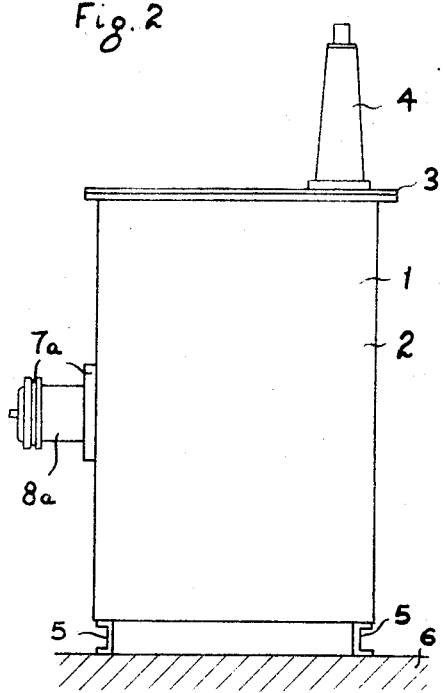
Figure 3:
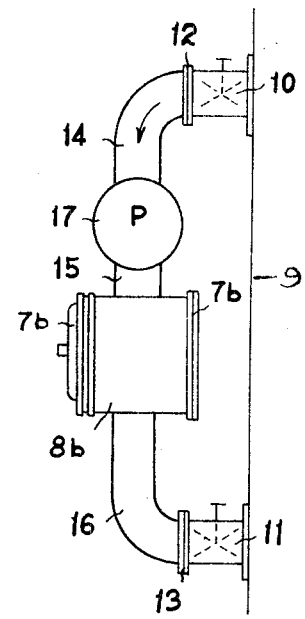
Figure 7:
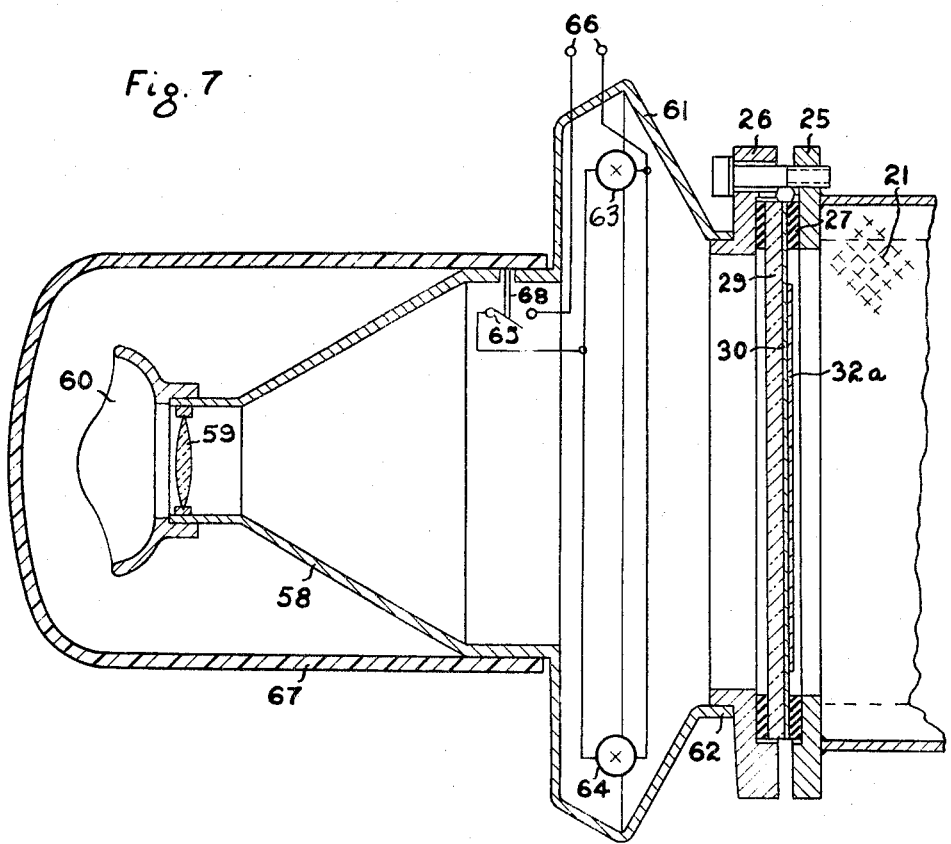
Figure 8:
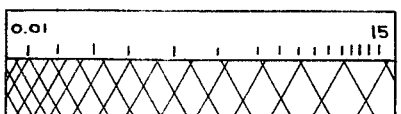

Examples of embodiments of the invention are explained by the appended drawings, wherein:

FIG. 1 illustrates the adsorption characteristic of the activated alumina used,

FIG. 2 diagrammatically illustrates a gas-filled electrical apparatus with a built-on device linked to the interior of the appliance for the purpose of permanently displaying the gaseous contaminants occurring in the gas filling, FIG. 3 diagrammatically illustrates part of the wall of a gas-filled electrical apparatus within a pipeline flanged on via closable slide-valves and comprising a pump and a device which is traversed by a forced flow of gas set up by the said pump, and which has the purpose of permanently displaying the gaseous contaminants occurring in the gas filling, FIG. 4 illustrates details of the device arranged in accordance with FIG. 2, FIG. 4a illustrates a modified embodiment of the device shown in FIG. 4 wherein the receptacle is subdivided into a plurality of spaces corresponding to the number of different indicator dyestuffs utilized, FIG. 5 illustrates an evaluating device on the principle of a slide-rule, with a colour-scale, for determining the content of decomposition gases in percentage by volume from the indicator colour and overall pressure, FIG. 6 illustrates a manometer with a device for automatically indicating the content of decomposition gases in percentage by volume, FIG. 7 illustrates a modified construction for the device and which is provided with an illuminated viewing arrangement; and FIG. 8 is a front view of the colour comparison table shown on edge in FIGS. 4 and 7.

With reference now to the drawings:

FIG. 1 shows the adsorption characteristics of the coarse-grained activated alumina which it is preferred to use according to the invention as the material with a relatively large internal surface containing OH ions, being the normal cubic centimetres of $SOF_2$ adsorbed per gram of alumina as a function of the partial pressure, curve A being the adsorption characteristic of undyed alumina, and curve B that of alumina dyed with the indicator.

FIG. 2 shows diagrammatically an electrical apparatus 1 with a gaseous filling consisting partly of sulphur hexafluoride $SF_6$, which apparatus is made up externally principally of a container 2 with a cover 3 and an electrical feed-through bushing 4, stands on feet 5 on a base or foundation 6, and which has built on to it a device 7a with a receptacle 8a, according to the invention to the interior of which the gas filling has access, which device permanently displays the gaseous contaminants produced in the gas filling by decomposition of the $SF_6$, substantially independently of the time for which they act.

FIG. 3 shows a part 9 of the external wall of an electrical apparatus with a gaseous filling consisting at least partly of sulphur hexafluoride, and having connected to it a pipeline 14, 15, 16 via closable slide-valves 10, 11 with the aid of flanges 12, 13, in which pipeline there is incorporated a gas-pump 17 and a device 7b with a receptable 8b according to the invention, which device permanently displays the gaseous contaminants produced in the gas filling by decomposition of the $SF_6$, substantially independently of the time for which they act; the gas filling has access to the said receptacle as a result of the fact that it is continuously or intermittently fed through the receptacle 8b of the device 7b with the aid of the pump 17. As compared to the embodiment according to FIG. 2, this method can result in the adsorption means coming into action more rapidly and the indicator dye responding more rapidly, especially in the case of apparatus with intrinsically small internal gas-circulation. The arrangement according to FIG. 3 may naturally be combined with a gas-circulator device as already present on some electrical apparatus. The filling, disposed according to the invention in the receptacle 8b, of granular material with a relatively large internal surface, containing OH ions, preferably coarse-grained activated alumina and at least partly dyed with at least one of the indicators previously mentioned which changes its colour with the pH value, may be changed without any appreciable loss of gas and without any break in operation of the electrical apparatus after the closable slide-valves 10, 11 have been closed; this applies also if the whole arrangement connected on with the aid of the flanges 12, 13 is being repaired or exchanged.

FIG. 4 shows an example of embodiment of the device 7a from FIG. 2. Here again, 2 is the wall of the container of the electrical apparatus, into which wall a flange 18 is welded. The flange 19 of the device is screwed to the said flange 18 with an interposed basket 20. The receptacle or housing 8a, for example of tubular shape, contains according to the invention granular material 21 with a relatively large internal surface, containing OH ions, and at least partly dyed with at least one indicator which changes its colour with the pH value, and is inwardly closed by a wire grid 22 in a frame 23, which is releasably attached in any expedient fashion to the inner flange 24 of the receptacle 8a. The outer flange 25 of the housing 8a is screwed to the flange 26; between them are the gaskets 27, 28, and between the latter the inspection glass 29, which is provided on the inside with a transparent coating 30 resistant to decomposition products of the $SF_6$, for example of organic glass or aluminium oxide. To protect the dyestuffs against fading, the inspection glass 29 can be made from a material which absorbs ultra-violet radiation. The inspection glass is externally shut off, for the purpose of protection against mechanical damage and also to protect the indicator dye from fading under the action of light, by a cover 31 which may be fastened in any expedient fashion, more particularly so that it remains closed automatically by gravity or spring action; a color-comparison table 32 as shown in FIG. 8 is fitted to the inside of the cover, being as a result likewise protected from fading, and being visible immediately beside or above the inspection glass when the cover is opened. The cover 31 is provided at the edge with cut-outs 33 so that any water which may be formed by condensation can run away. The design of the flange 26 which may be seen from the figure ensures that in spite of the cut-outs no incident light can impinge on the inspection glass when the cover is closed.

Alternatively, the colour comparison table 32, a front view of which is shown in FIG. 8, may be arranged in position 32a, indicated in FIG. 4, e.g. printed on the organic glass coating 30 where it is seen amidst the filling 21 and together with the latter's hue through the inspection glass 29 so that the inspection glass cannot affect the result of the colour comparison even if the glass itself, perhaps because of the fact that it absorbs ultra-violet radiations, is not exactly colourless.

In FIG. 8, not all of the numerals on the table have been shown. However, in principle they are the same as indicated in FIG. 5.

Moreover, if located at the inside of cover 31, the colour comparison table 32 may be replaced with a modified embodiment as shown in FIG. 5, which is described hereinafter in detail. Also, the comparison table may be made detachable from the receptacle structure.

FIG. 4 shows still further parts which serve to make it easy to change the filling, and without the electrical apparatus suffering any appreciable loss of gas or having to have its operation interrupted for this purpose. These further parts are described hereinafter while a change of the filling 21 is being described. For this purpose, the thrust screws 35, 37 which are located in internally threaded eyes 34 and have gaskets 36 under their head-collars, are loosened until they are disposed in the position indicated by screws 37. As a result, the inner cover 38, which bears by gravity via ribs 39 extending radially outwards against the thrust screws 35, 37 and is articulated via a stirrup 40 to the inside of the container wall, comes loosely to bear first of all by way of its gasket 41 against the flange 18, and assumes position 42, while the gasket assumes position 43, as shown in the lower half of FIG. 4, and the device is then removed by releasing the screws 44; the fact that the gas filling in the container is under pressure then ensures that the cover 42 is heavily pressed with a sealing action by way of the gasket 43 against the inside of the flange 18. Any loss of gas can then take place only via the threads of the screws 35, 37 since their gaskets no longer bear against the eyes 34, but if the thread is suitably chosen this loss of gas remains minimal. The device now being unscrewed, the filling 21 may now be changed without any difficulty once the end flange 23 has been released together with the wire grid 22. This method also dispenses with the need to release the inspection glass from its screwed attachment, with the possibility of damage to the said glass, and only the gasket 20 would have to be renewed should it have been spoiled by clumsy work.

Once the filling 21 has been changed, the device according to the invention is re-fitted in reverse sequence, and hence no detailed explanation is believed necessary.

It should furthermore be mentioned that the interior of the receptacle 8a may readily be subdivided by the insertion of partitions substantially parallel to its axis, and thus arranged to receive fillings 21 of various colours. Such an arrangement is shown in FIG. 4a which would correspond to a section taken along line A—A in FIG. 4, and wherein only the receptacle 8a with its flange 19 are in general illustrated. The desired sub-division of the interior of the receptacle is effected by means of parallel spaced partitions 56, 57 fixed within the receptacle in any suitable manner but which must not fit tightly. If the gas filling is at a high overall pressure, it is advisable to avoid a flat inspection glass; the latter should then rather be made cylindrical and the device correspondingly re-designed, or an inspection glass should be avoided altogether, and the indicator dye be made capable of being monitored with the aid of illumination and an optical or electro-optical observation device.

FIG. 5 shows an evaluating device according to the invention, with a first unit 45 comprising a colour-comparison table, which is indicated in FIG. 5 by cross-hatching with spacings increasing to the left, to correspond to the continuous transition of the colours; the colours are arranged in this direction in the sequence in which the indicator passes through them with increasing partial pressure of the gaseous contaminants which it detects. The evaluating device furthermore comprises a second unit 46, carrying a scale 47 for the overall pressure of the gas filling in the electrical apparatus in absolute atmospheres and a scale 48 for the content of contaminants in percentages by volume. One of the two units 45, 46 is displaceable with respect to the other, and the scales 47, 48 are so arranged that when a pointer 49 fixed to the unit 45 is set to the overall pressure, read off on a manometer, of the gas filling on scale 47, the content of gaseous contaminants in percentage by volume may be read off on scale 48 against the colour on the colour-scale on the unit 45 corresponding to the indicator colour. The evaluating device thus serves to obtain in simple fashion the content of gaseous contaminants in percentage by volume from the partial pressure of the gaseous contaminants corresponding to the indicator colour-change and from the overall pressure of the gas filling.

The evaluating device is shown in FIG. 5 in rectilinear form after the manner of a slide-rule, but it may also be made circular after the manner of a circular slide-rule. It may be fastened to the electrical apparatus beside the inspection glass, substantially in lieu of the part 32 or 32a in FIG. 4, but may also be carried about by the observer, and held beside the inspection glass in order to compare the colour-tint.

FIG. 6 shows a further development of the evaluating device, combined with the manometer which is normally provided in the case of gas-filled electrical apparatus. In this connection, the manometer needle 50 sets itself to the overall pressure of the gas filling, which may itself be read off on the manometer scale 51. Upon being deflected, however, the manometer needle simultaneously rotates the ring 52 fast with it, upon which ring there is a colour-comparison scale similar to that on part 45 in FIG. 5, but arranged in circular fashion, beginning and ending at the point 53. Once the colour on the ring 52 corresponding to the indicator colouring has been found, the content of decomposition gases in percentage by volume is read off on scale 54 against the said ring colour, without any need for this purpose to worry about the over-all pressure of the gas filling.

Since it is advantageous for the indicator colouring and the colour-comparison scale to be observed directly side-by-side and under the same conditions, the arrangement according to FIG. 6 may be embodied with the periphery 55 of the scale 54 also representing the outer limit of the inspection glass (for example 29 in FIG. 4) in plan view, the scale 54 being disposed on the inspection glass and the indicator colour being visible behind the said scale, while the manometer with the needle 50, scale 51 and ring 52 with the colour-comparison scale is fitted to the inside of the inspection glass in the middle thereof.

FIG. 7 illustrates a modification of the embodiment shown in FIG. 4 in which means are provided for viewing the dyed indicator material and the colour comparison table in essentially a side-by-side manner by using artificial illumination emanating from the same light source. As previously explained, use of a common illumination source provides identical spectral composition and the same intensity and thus not only facilitates taking a reading but also increases its accuracy. In such embodiment, the cover element 31 of the FIG. 4 construction is replaced by an optical viewing unit, and the comparison table is located at the inside face of coated inspection glass 29. It is thus in the alternate position 32a described in connection with the FIG. 4 structure.

The optical viewing unit is composed of a housing having a rearward conic part 58 containing an eyepiece including a lens 59 and eye-cup 60, and a forward part 61 of larger diameter which terminates in a cylindrical part 62 which is attached to a surface of ring 26. Located in the forward part 61 of the optical housing are a pair of lamps 63, 64 which are wired to terminals 66 adapted to be connected to a source of electrical supply for illuminating the lamps. Connected into the wiring circuit for the lamps in a switch 65, the contacts of which are controlled by a pin type actuator 68 which is adapted to protrude through a small opening in the wall of the housing part 58. A protective, detachable cap 67 which may be made of any suitable material such as a polyamide or polypropylene plastic is adapted to make a press fit over the housing part 58 and serves to protect the eye-piece from dirt and adverse atmospheric influences when the device is not in use. When cap 67 is removed, the outer end of the pin actuator 68 for switch 65 is released and snaps outwardly to effect closure of the switch contacts and hence effect energization of lamps 63, 64 as a result of a spring bias arrangement, not illustrated, which tends to keep the switch contacts closed; the switch contacts are opened against this bias as a result of inward movement of pin 68, when cap 67 is replaced.

When lamps 63, 64 are lit, they serve to illuminate the dyed indicator material 21 and also the colour comparison table 32a, it being understood that the latter will cover only part of the area of the inspection glass 29 so that the dyed indicator material 21 can be observed through the remaining area, thus, in effect placing the two in a side-by-side relation for simultaneous viewing through the eye-piece of the optical unit.

I claim:

1. In a device for use in monitoring the condition of a gaseous filling within an electrical apparatus comprising at least partly sulphur hexafluoride by recognition of gaseous contaminants produced in the gas filling as a result of decomposition of the sulphur hexafluoride, the combination comprising a receptacle containing at least one granular material containing OH ions and having a relatively large internal surface, said material being at least partly dyed with at least one indicator dyestuff which changes its colour or colour saturation with the pH value, whereby said material exhibits a permanent and irreversible change in colour or colour saturation with the partial pressure of said gaseous contaminants as a result of their initial contact with the material, and means for introducing the gaseous filling into said receptacle from said electrical apparatus.

2. A monitoring device as defined in claim 1 wherein said material containing OH ions is constituted by a coarse-grained activated material selected from the group consisting of alumina and magnesia.

3. A monitoring device as defined in claim 1 wherein said indicator dyestuff is metanil yellow.

4. A monitoring device as defined in claim 1 wherein said indicator dyestuff is 4-dimethylaminoazobenzene.

5. A monitoring device as defined in claim 1 wherein said indicator dyestuff is quinaldine red.

6. A monitoring device as defined in claim 1 wherein said indicator dyestuff is crystal violet.

7. A monitoring device as defined in claim 1 wherein said material containing OH ions is constituted by a coarse-grained activated material selected from the group consisting of alumina and magnesia and wherein said indicator dyestuff is metanil yellow.

8. A monitoring device as defined in claim 1 wherein said material containing OH ions is constituted by a coarse-grained activated material selected from the group consisting of alumina and magnesia and wherein said indicator dye-stuff is 4-dimethylaminobenzene.

9. A monitoring device as defined in claim 1 wherein said material containing OH ions is constituted by a coarse-grained activated material selected from the group consisting of alumina and magnesia and wherein said indicator dyestuff is quinaldine red.

10. A monitoring device as defined in claim 1 wherein said material containing OH ions is constituted by a coarse-grained activated material selected from the group consisting of alumina and magnesia and wherein said indicator dyestuff is crystal violet.

11. A monitoring device as defined in claim 1 wherein said receptacle also includes material dyed with a humidity indicator substance such as a cobalt salt.

12. A monitoring device as defined in claim 1 wherein a part of said granular material containing OH ions is dyed with a humidity indicator substance such as a cobalt salt.

13. A monitoring device as defined in claim 1 wherein said receptacle is sub-divided into a plurality of compartments each of which contains granular material containing OH ions and which is dyed with a different indicator dyestuff.

14. A monitoring device as defined in claim 1 and which further includes pumping means for forced circulation of the gaseous filling from said electrical apparatus to said receptacle.

15. A monitoring device as defined in claim 1 and wherein said receptacle is located exteriorly of said electrical apparatus and is provided with an inspection glass to provide for viewing the dyed granular material.

16. A monitoring device as defined in claim 15 and wherein said receptacle further includes a removable cover for said inspection glass for protection against continuous exposure of said dyed granular material to incident light.

17. A monitoring device as defined in claim 1 wherein said receptacle is mounted on a wall of said electrical apparatus and surrounds a cover in said wall, means for opening said cover when said receptacle is in place on said electrical apparatus thereby establishing communication therebetween for the inflow of gas filling into said receptacle, and means establishing automatic re-closing of said cover as said receptacle is removed.

18. A monitoring device as defined in claim 1 and wherein said receptacle includes a colour-comparison table for at least one indicator dyestuff and is accessible to an observer.

19. A monitoring device as defined in claim 1 wherein said receptacle includes a colour-comparison table which is arranged in essentially side-by-side relation to said dyed granular material for simultaneous viewing, lamp means for simultaneously illuminating said colour-comparison table and said dyed granular material, and optical means through which said viewing is established, said optical means being located within a housing containing said lamp means.

20. A monitoring device as defined in claim 1 and which further includes an evaluating device therefor, said evaluating device comprising a first unit including a colour-comparison table in the form of a colour-scale on which the colours are arranged in the sequence in which the granular indicator material passes through them with increasing partial pressure of the gaseous contaminants which it detects, and a pointer fast therewith, and a second unit comprising a scale for the overall pressure of the gas filling in said electrical apparatus and a scale for the content of contaminants in percentages by volume, one of said two units being displaceable with respect to the other, and said scales being correlated such that when said pointer is set to the overall pressure of the gas filling, the content of contaminants in percentage by volume may be read off on the colour scale against the colour corresponding to the colour of the granular indicator material.

21. A monitoring device as defined in claim 20 wherein said pointer and overall pressure of the gas filling are automatically brought into agreement by a manometer.

References Cited

UNITED STATES PATENTS 3,311,484  3/1967  Kemeny et al. _____ 23—254

OTHER REFERENCES

Giles, C. H., et al.: Chemical Abstracts, vol. 62, pp. 1110–1, and index p. 722s (1965).

Gutbier, H., et al.: Chemical Abstracts, vol. 67, p. 10687 (1967).

Merck Index, 7th edition, pp. 298, 368, 660, 886 (1963).

Skanavi, M. D. et al.: Chemical Abstracts, vol. 59, p. 1089 (1963).

MORRIS O. WOLK, Primary Examiner

E. A. KATZ, Assistant Examiner

U.S. Cl. X.R.

23—253